W. C. CONNELLY.
VALVE.
APPLICATION FILED MAY 24, 1921.
1,438,747.
Patented Dec. 12, 1922.
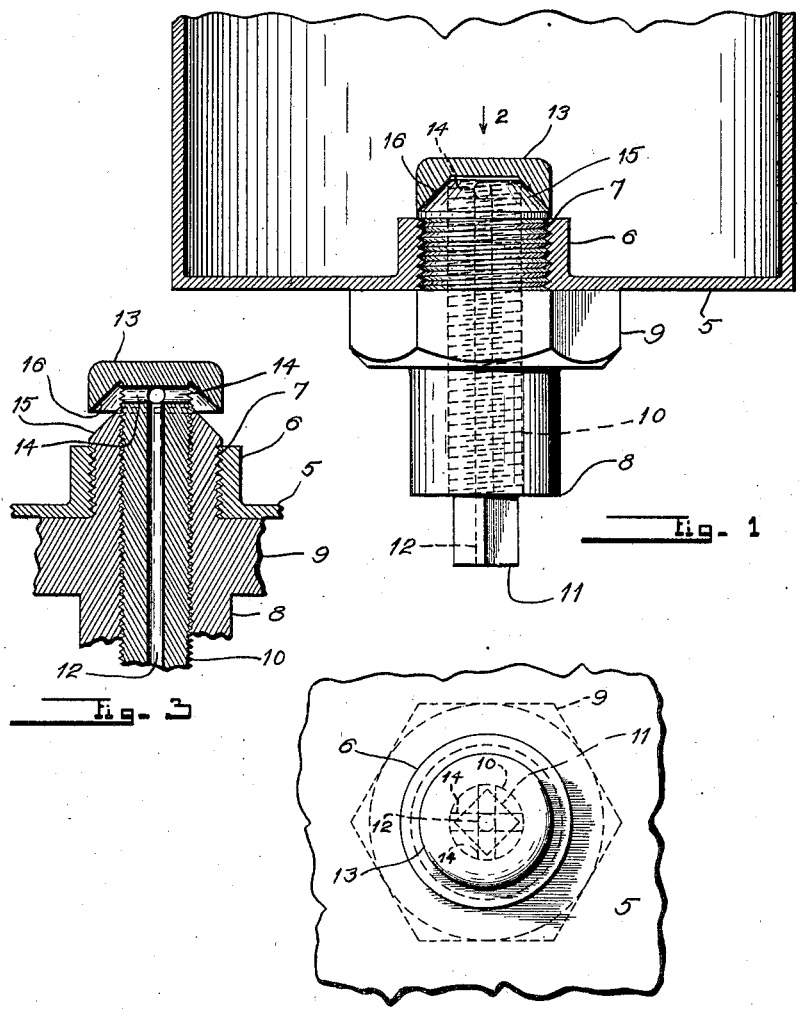
Inventor
William C. Connelly
By John W. Darley
Attorney Patented Dec. 12, 1922.

1,438,747

UNITED STATES PATENT OFFICE.

WILLIAM C. CONNELLY, OF BALTIMORE, MARYLAND.

VALVE.

Application filed May 24, 1921. Serial No. 472,106.

*To all whom it may concern:*

Be it known that I, WILLIAM C. CONNELLY, citizen of the United States, residing at Baltimore, in the State of Maryland, have invented certain new and useful Improvements in Valves; and I do hereby declare the following to be a full, clear, and exact description of the invention, such as will enable others skilled in the art to which it appertains to make and use the same.

My invention relates to valves.

Among the objects of my invention are:—

To produce a valve suitable for use in tanks and so constructed that it will be capable of breaking any ice films that may form adjacent to the sealing surfaces of the valve.

To produce a valve so constructed and arranged that deposition of sediment upon the sealing surface thereof is prevented.

To produce a valve having the above-named characteristics which shall be simple, cheap and efficient.

In carrying out my invention I make use of the instrumentalities illustrated in the accompanying drawings, in which:

Figure 1 shows the central section of a tank equipped with one of my improved valves for draining the contents therefrom. In this view the head formed on the valve stem is shown in section.

Fig. 2 is a view of the parts shown in Fig. 1 looking in the direction of the arrow 2 in said figure.

Fig. 3 is a central section of the valve stem and upper portion of the nipple 8, the stem being in the position into which it is moved in order to open the valve.

In the drawings:

5 represents the bottom of a tank preferably provided with a neck 6 having a threaded hole in which is screwed the threaded end 7 of the nipple 8. The nipple 8 is preferably formed integrally with the hexagon head 9 by means of which the threaded end 7 may be firmly screwed within the hole in the neck 6. The nipple 8 is provided with a threaded hole in which is screwed the valve stem 10. The valve stem 10 is provided on its lower end with a squared portion 11 for the reception of a wrench and with a central hole 12 extending from the bottom of said stem to near the head 13 which is formed integrally with the stem 10. The hole 12 communicates at its top with the cross holes 14—14 which terminate at the threaded outer surface of the stem 10.

The upper end of the nipple 8 is provided with a chamfered portion 15 against which fits the frusto-conical surface 16 formed on the inner side of the head 13.

The operation of my improved valve is as follows:—

The parts being in the positions shown in Fig. 1, it is evident that no liquid contained within the tank can pass out through the hole 12 because a double seal exists, namely: One between the frusto-conical surface 16 of the head 13 and the chamfered portion 15 of the nipple 8; and the other between the surface of the stem 10 and the threaded hole in the nipple 8 in which it is screwed.

It is evident that when the parts are in these positions any sediment accumulating in the bottom of the tank will be deflected by the head 13 away from the juncture of the surface 16 and chamfered portion 15. Furthermore, it is evident that if film of ice should form about these parts, when a wrench is applied to the squared end 11 the threaded valve stem may be screwed upwardly with sufficient force to break the films of ice.

When the valve stem 10 is sufficiently high to bring the head 13 into the position shown in Fig. 3, then the liquid within the tank may flow through the cross holes 14—14 into the central hole 12 and so from the tank.

Thus it will be evident that in my improved valve, the valve surfaces are shielded from sediment and provision is made for breaking accumulations of ice thereabout.

While I have shown one embodiment of my improved valve for purposes of illustration, it is to be understood that I do not desire to be limited thereby, for many changes may be made therein without departing from the spirit of my invention.

I claim:—

The combination with a tank comprising a bottom, of a nipple mounted in said bottom and having a threaded hole and a salient frusto-conical end projecting upwardly in said tank, a valve stem screwed in said hole and having a head to make valve tight engagement with said end and passages communicating with the interior of said tank when said head is disengaged from said end.

In testimony whereof, I affix my signature.

WILLIAM C. CONNELLY.